Feb. 26, 1935. C. TURNEPSEED 1,992,558
TURNING, FORMING, AND THREADING ATTACHMENT FOR DRILL PRESSES
Filed July 25, 1934 4 Sheets-Sheet 1

INVENTOR.
Clarence Turnepseed,
BY
ATTORNEYS

Feb. 26, 1935.   C. TURNEPSEED   1,992,558
TURNING, FORMING, AND THREADING ATTACHMENT FOR DRILL PRESSES
Filed July 25, 1934    4 Sheets-Sheet 2
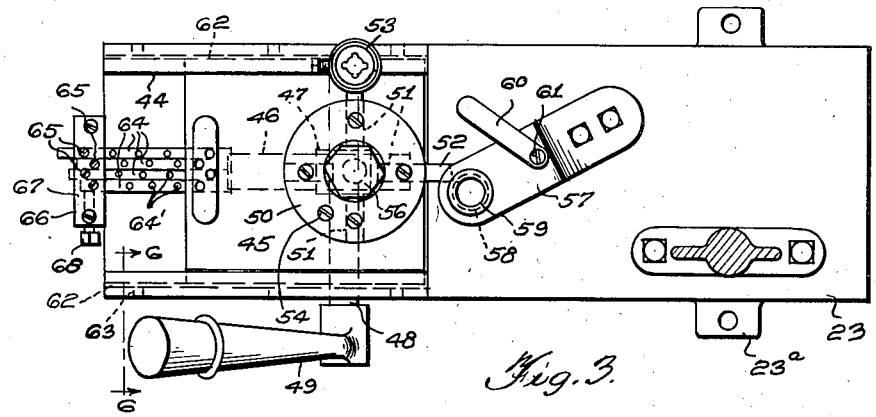
Fig. 3.
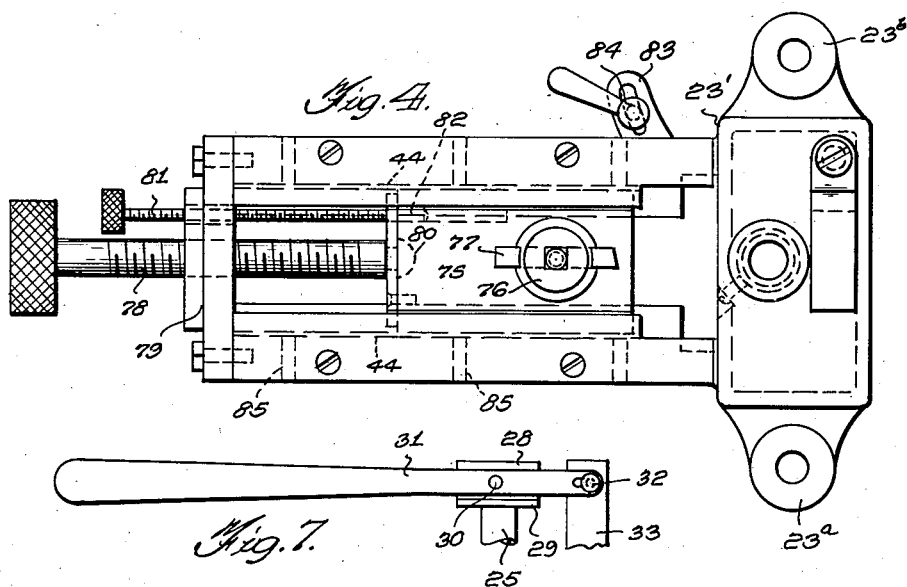
Fig. 4.
Fig. 7.
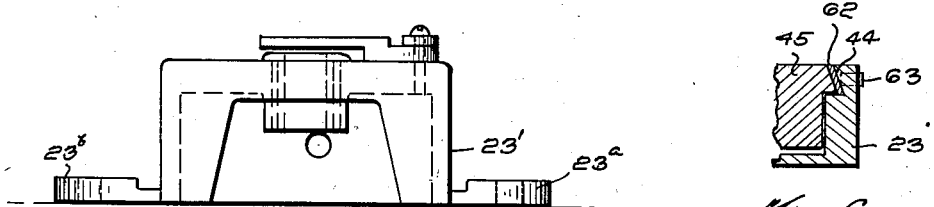
Fig. 5.
Fig. 6.
INVENTOR.
Clarence Turnepseed,
BY
ATTORNEYS

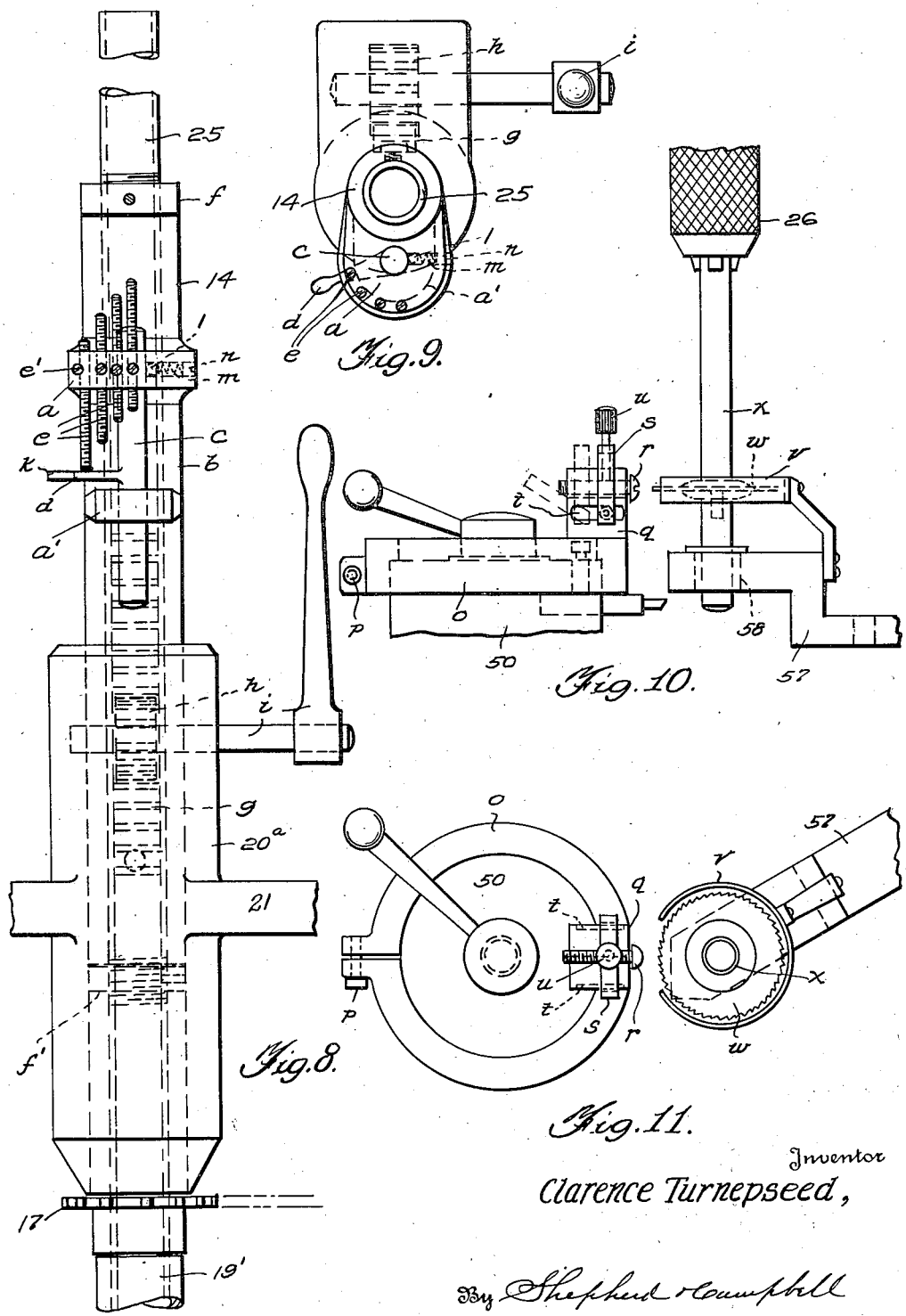

Feb. 26, 1935.  C. TURNEPSEED  1,992,558
TURNING, FORMING, AND THREADING ATTACHMENT FOR DRILL PRESSES
Filed July 25, 1934  4 Sheets-Sheet 4
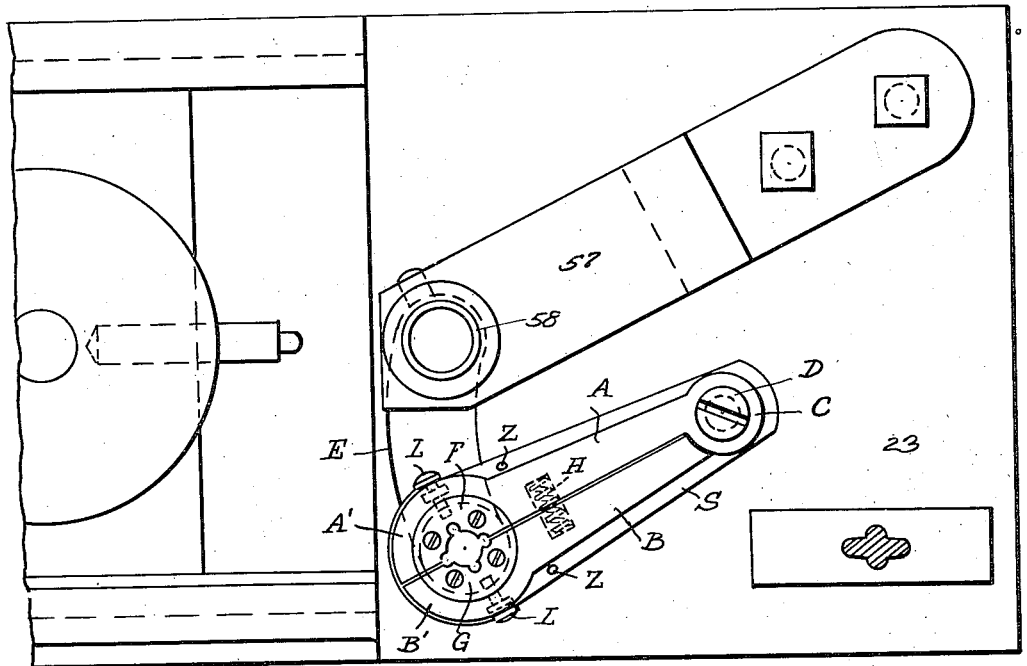
Fig. 12.
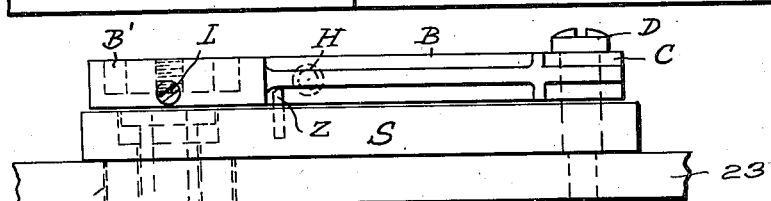
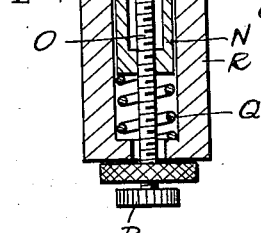
Fig. 13.
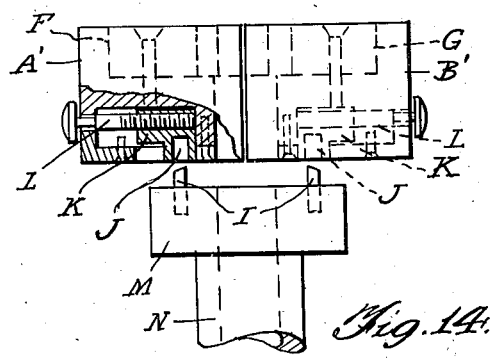
Fig. 14.
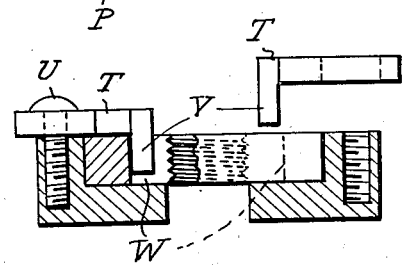
Fig. 15.
Inventor
Clarence Turnepseed,
By Shepherd & Campbell
Attorneys Patented Feb. 26, 1935

1,992,558

UNITED STATES PATENT OFFICE 1,992,558

TURNING, FORMING, AND THREADING ATTACHMENT FOR DRILL PRESSES

Clarence Turnepseed, Springfield, Ohio, assignor of one-fourth to Frank G. Campbell, Arlington County, Va.

Application July 25, 1934, Serial No. 736,922

26 Claims. (Cl. 29—26)

This invention relates to a combined drill press and lathe and more particularly to a device in the form of a simple and relatively cheap attachment, adapted to be applied to existing drill presses and by means of which stock may be worked in a way which would ordinarily require the use of a lathe.

Further objects and advantages of the invention will be set forth in the detailed description which follows:

In the accompanying drawings, Figure 1 is a view partly in side elevation and partly in section of an apparatus constructed in accordance with the present invention.

Fig. 3 is a plan view of the turret form of slide.

Fig. 4 is a plan view of a modified form of tool carrying slide.

Fig. 5 is an end elevation of the structure as illustrated in Fig. 4.

Fig. 6 is a detailed sectional view on the line 6—6 of Fig. 3.

Fig. 7 is a detailed view of an operating handle hereinafter described.

Fig. 8 is a view in elevation, and

Fig. 9 is a view in plan of a modified form of stop mechanism.

Figs. 10 and 11 are respectively side and plan views of a screw slotting attachment adapted to cooperate with the chuck and turret of Fig. 1 in a manner hereinafter described.

Fig. 12 is a plan view, and

Fig. 13 is a side view of a self-opening die attachment hereinafter described.

Fig. 14 is a view partly in end elevation and partly in section of the die-holder of Figs. 12 and 13.

Fig. 15 is a detailed sectional view of a holding means for retaining the die in the die-holder.

Like numerals designate corresponding parts in all of the figures of the drawings.

Figures 1, 2:
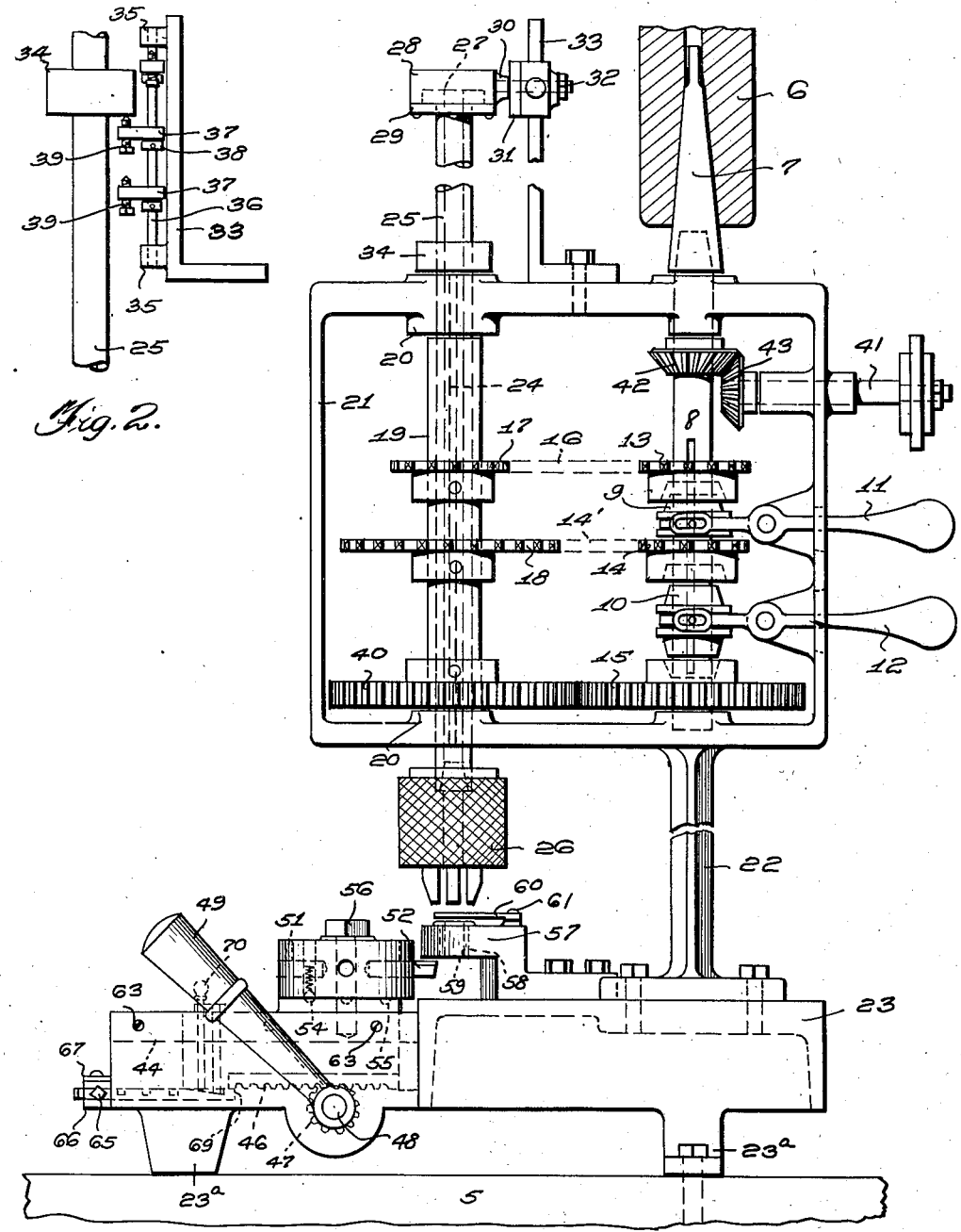
Fig. 2 is a detailed view of the stops hereinafter described.

Referring to the drawings, 5 designates the drill table and 6 the drill socket. These elements are common to conventional drill presses and are very familiar to all mechanics. In the preferred embodiment of the invention, the shank 7 of a change speed gearing is inserted in the drill socket 6. This shank is carried by a shaft 8 having the two clutch elements 9 and 10 splined thereon. These clutch elements are adapted to be shifted longitudinally of the shaft by the operating handles 11 and 12. The clutch element 9 is adapted to connect a high speed forward drive sprocket 13 with shaft 8. The clutch element 10, when moved upwardly, connects a slow speed forward drive sprocket 14 to shaft 8 and when thrown downwardly connects a reverse gear 15 to the shaft 8. The sprocket 13 drives by a chain, indicated in dotted lines at 16, to a sprocket 17 of the same size. The sprocket 14 drives through chain 14' to a larger sprocket 18 (that is preferably twice the size of sprocket 14). The sprockets 17 and 18 are fast upon a sleeve 19, the ends of which are disposed between bosses 20 of a casing 21 in which the change speed gearing is contained, said casing, as a whole, being supported upon a standard 22 from the tool carrying block 23 hereinafter described.

The sleeve 19 is in turn splined, as indicated at 24, to a hollow shaft 25 through which the stock that is to be worked is adapted to extend, and this shaft 25 carries upon its lower end a conventional type of drill chuck 26. The upper end of the shaft 25 is provided with a head 27 that is rotatably mounted in a block 28, said head 27 being held in place by the cap 29.

A lateral extension 30 of block 28 has pivotal engagement with a hand operating lever 31, the inner end of said lever being fulcrumed, at 32, to a bracket 33. It is apparent that this lever will provide means for raising and lowering hollow shaft 25 and the stock gripped by clutch 26, during rotation of said shaft. A collar 34 limits the downward movement of shaft 25 and I may in addition provide stops upon the bracket 33, as indicated in Fig. 2 for permitting step by step movements of the shaft 25, each step being of a determined length. This is accomplished by providing upon the bracket 33 or equivalent structure, supporting arms 35 which carry a shaft 36. Arms 37 are swingingly mounted on shaft 36 and their downward movement is limited by collars 38. Set screws 39 provide for a finer adjustment, it being understood that after the stock has been fed down one step until one cut has been made upon the same and the collar 34 has come in contact with one of the screws 39, the arm carrying that particular screw is thrown aside and out of the path of movement of collar 34 so that an additional downward movement may be imparted to the stock to make an additional cut.

This arrangement provides for the making of duplicate lengths when turning more than one diameter on a piece of stock. When the high speed forward mechanism is in gear, the drill chuck and stock are rotated at the proper speed for turning. When the slow speed forward mechanism is in gear, the stock is rotated at the proper speed for threading or knurling and when the reverse gear 15 is clutched to the shaft it imparts a reduced speed reverse movement to the stock through gear 40 which is useful in withdrawing the stock when threading, etc., as hereinafter described.

As an additional feature of convenience, I propose to provide a grinding wheel shaft 41 that may be driven by bevel gearing 42 and 43 from shaft 8, and a clutch may be provided in the length of shaft 41, if desired, to throw the grinding wheel out of action. However, there is no objection to permitting it to run continuously.

I have disclosed in the accompanying drawings two types of tool carrying devices adapted to be secured to the drill table 5. The type shown in Fig. 4 comprises a slide carrying a single cutting tool, while the type shown in Fig. 1 is of the turret type and carries a plurality of tools one or more of which may be dies for threading, knurling tools or other suitable tools.

These attachments each comprise a base block 23 having feet 23a adapted to be bolted to the drill table. The turret type of block is provided with dove-tailed guideways 44 in which a slide 45 is mounted. This slide is provided with a rack bar 46 upon its under side which is engaged by a pinion 47 on a transverse shaft 48. An operating handle 49 serves to impart turning movement to the pinion and consequently to feed the slide 45 inwardly or outwardly away from the stock. This slide carries a rotative turret 50 that is provided with a plurality of recesses 51 adapted to receive tools 52 of various kinds, such as turning tools, cut off tools and the like, or this turret may carry one or more threading dies, such as is indicated at 53. This turret may be provided with a spring actuated detent, such as the ball indicated at 54, which is adapted to snap into anyone of the recesses indicated at 55 to properly locate and align the tools.

A bolt 56 mounts the turret for rotation and serves as a binding means for said turret. The base block 23 carries a guide 57. This guide in turn carries suitable bushings which may comprise an outer bushing 58 and an inner bushing 59. A plurality of bushings 59 are used having internal diameters of various sizes but having external diameters of a uniform size. Thus, these bushings may all be received within the bushing 58 but will take care of and guide stock of varying diameters. The stock stop 60 is pivoted, at 61, to the guide 58 and serves a purpose which will be hereinafter set forth.

I prefer to mount the slide 45 loosely enough in its ways 44 to permit the use of a take-up gib 62, which gib may be set up by screws 63, as occasion requires, so that wear may be compensated for at any time. To variably limit the inward movement of the slide 45 and its tool under the influence of handle 49, I provide a plurality of bars 64 which are adapted to be bound in varying positions of longitudinal adjustment by screws 65. These bars pass through a block 66 upon the rear end of base block 23 and are held down by cap 67. The screws 65 are for the purpose of holding all of the bars except the one that is being adjusted. After all of the bars have been adjusted they are clamped, as a whole, against movement by a screw 68. These bars have upturned hook-like ends 69 which are adapted to be engaged by pins 70, said pins being inserted in corresponding openings in the slide and it is apparent that any given one of the bars will control the inward movement of the slide if all of the pins 70 except the one associated with said bar, are removed. Thus, successive inward movements of the tool carrying turret may be effected, each movement being of a predetermined extent, and subsequent movements of exactly the same extent may be effected by utilizing the same bars as the limiting means for the movement of the tool carrying slide.

The structure illustrated in Figs. 4 and 5 operates in substantially the same way, that is to say, this structure comprises the base block 23' having the lugs or feet 23b by which it may be secured to the drill table 5. A slide 75 carries an upstanding tool post 76 adapted to receive the tool 77. Movement may be imparted to the slide by a screw 78 which is threaded in cap 79 and is provided with a head 80. This head is so engaged with the slide 75 as to permit turning movement of the screw and longitudinal movement of the slide under the bodily endwise travel of the screw.

A stop screw 81 passes freely through the cap plate and is threaded into the slide 75, as indicated at 82. The adjustment of this screw 81 determines the extent of inward movement which may be imparted to the slide under the influence of screw 78. Where bolts are used in the lugs 23b, which are somewhat smaller than the openings in said lugs, a limited angle of adjustment of the tool carrier, as a whole, may be effected through the medium of a slotted ear 83 and a binding member 84 of conventional form, it being understood that this member engages the drill table in a manner very common in lathe constructions.

The bars 64 of Fig. 1 may be used in the construction of Fig. 4 and may be in addition to or in lieu of screw 81.

The same take-up gib for taking up wear of the slide, that is used in Fig. 3 may be used in Fig. 4. Screws 85 serve to press said gib toward the slide.

I prefer to provide the bars 64 with a series of openings 64' adapted to receive a center punch or other tool so that when the slide is thrust rearwardly it will strike against such tool and move the bars outwardly in the resetting of the same.

From the foregoing description it will be seen that by this invention I have provided a relatively simple and inexpensive mechanism by virtue of which a large number of small shapes, such as arbors, pintles, screws, and the like, may be turned upon an ordinary drill press. While I prefer to utilize the change speed gearing of Fig. 1 between the drill socket 6 and the chuck 26, it is apparent that the utility of the device is not limited to the employment of this change speed gearing and that, as a very simple and cheap arrangement, the drill socket 6 could be the chuck carrying medium in the usual way and a piece of stock actuated directly thereby could be turned by the tool of Figs. 1 or 4. Many of the conventional types of vertical drill presses have change speed devices incorporated in their basic structure to provide for running the spindle at a reduced speed when heavy work is being done. In such machines as that I may, as stated, mount the stock carrying chuck directly in or on the drill spindle 6 and still retain the advantage of variable speeds of movement of the stock being operated upon.

It is thought that the operation of the device will be apparent to those skilled in the art, however, it may be briefly stated that either tool 52 or tool 77 is fed forward by its actuating mechanism to engage and operate upon stock passing through brushing 59 and to which the turning movement is imparted by drill chuck 26.

When the hollow shaft 25 of Fig. 1 is employed, a piece of stock of considerable length may be passed therethrough and successive pieces such as arbors, pintles, screws, and the like, may be formed from and then cut off of said stock. To insure that the same length of stock is fed down below the chuck, each time, preparatory to operating upon the same, the stock stop 60 is swung over the bushing 59 and when the chuck is loosened, the stock is lowered until it rests upon this stock stop after which the chuck is tightened. Then, the stock stop is swung to one side and the operator is ready to repeat the previous operation and he can, with this machine and this attachment, make any desired number of exact duplicates, by the proper setting of the stops 37 and 39. While I have shown only two of these stops for purpose of illustration, it is to be understood that any desired number may be employed.

Referring now to the modified form of stop mechanism illustrated in Figs. 8 and 9, it may be stated that for purposes of identification the same reference characters have been applied in so far as like parts are used, and it will be seen by reference to these figures that the shaft 25 and sprocket 17 are like the corresponding members in the structure previously described. In this modification, bosses $a$ and $a'$, which are cast integral with the sleeve $b$, are pierced for the passage of a rod or plunger $c$, to which is attached the stop proper $d$. This stop consists of a laterally extending arm adapted to engage either of a number of stop screws $e$, the lower ends of which are set at varying heights, to thereby permit step-by-step downward movement of the sleeve.

The spindle or hollow shaft 25 rotates in sleeve 14, said spindle carrying thrust collars $f$, $f'$, to hold it in proper relation to the sleeve. These collars force the spindle up or down when the sleeve is raised or lowered, by means of a rack $g$, pinion $h$, and operating handle and shaft $i$. The stop screws $e$ are clamped in position by the lock screws $e'$. A handle extension $k$ on the stop $d$, is for convenience in swinging the stop around to cause it to lie beneath one or the other of the screws $e$ as the case may be. A friction detent consisting of a ball $l$, spring $m$, and compression screw $n$, for the spring, serves, through the thrust of the ball against the plunger $c$, to keep said plunger from falling away from the lower end of the screws.

Upper boss 20 of Fig. 1, is, in this modification, extended upwardly outside of the case 21 as indicated at 20a, and is extended downwardly inside the case to the sprocket 17, and is bored its full length to permit the sleeve $b$ to travel down to the sprocket 17, for the purpose of lengthening the lower extremity of travel of the parts. A splined sleeve 19', corresponding to the like sleeve 19 of Fig. 1, is used from this point down, i. e., from the hub of sprocket 17 in the manner described with respect to Fig. 1, it being understood that this splined sleeve carries the sprockets 17, 18 and gear 40 as shown in Fig. 1. The lower end of the upper boss 20a serves as a bearing against splined sleeve 19 and the sprocket 17 carried by said splined sleeve.

By referring to Fig. 9, it will be seen that the upper boss 20a is extended rearwardly far enough to form a housing for the pinion $h$ and the shaft of handle $i$. It will readily be understood that when the handle $i$ is moved to thrust the sleeve $b$ downwardly, said sleeve will move only until the lower end of plunger $c$ strikes the top of boss 20a. The time at which this happens is determined by the radial position of the stop $d$, it being manifest that the shortest downward stroke of sleeve $b$ takes place when the parts are in the position illustrated in Fig. 8, and that the longest downward stroke takes place when the stop $d$ underlies the right-hand screw $e$ of the group, because in this latter position the stop $d$ can move upwardly until it abuts the lower end of the right-hand screw $e$ and thus the lower end of the plunger $c$ lies further up the sleeve $b$, and said sleeve can move downward a greater distance before the lower end of the plunger $c$ abuts the top of the boss 20a.

In utilizing the screw slotting attachment illustrated in Figs. 10 and 11, I clamp a ring $o$ around the turret 50 by means of a screw $p$. A block $q$ carried by said ring has a V-shaped upper face within which the screws to be slotted, and one of which is indicated at $r$, are received. A yoke $s$ is adapted to be swung and moved in a slot $t$ of the block from the full to the dotted line position indicated. A set screw $u$ threaded through the top of the yoke bears upon the screws to be slotted when the yoke is in a vertical position and said screw is screwed down. After the screw head has been slotted and the screw is to be removed, the said screw $u$ is released and the yoke is swung over to the dotted line position illustrated. Secured to the guide 57 of Fig. 1 is a saw guard $v$. A circular slotting saw $w$ is carried by a spindle $x$ adapted to be clamped in the chuck 26 of the drill press. The guide sleeve 58 serves as a guide for the lower end of the spindle. If now the turret be advanced toward the saw, the head of the screw will be slotted and the depth of the cut may be determined by the adjustment of a stop-bar 64, see Fig. 3, or through any other means for limiting the forward feeding movement of the turret.

The modification illustrated in Figs. 12, 13 and 14 is intended to provide an attachment for the structure of Fig. 1 by means of which a self-opening die may be mounted upon the block 23 in such fashion that a piece of stock to be threaded may be held in the chuck 26, forced downwardly into the die and threaded, said stock at the completion of the threading movement automatically releasing the die and permitting the same to open so that the threaded article may be withdrawn from the die without the necessity of reversing the direction of rotation of the spindle 25 and chuck 26. The instrumentalities by which this is accomplished comprise a die-carrier consisting of the arms A and B. These arms are pivoted by a screw D to the block or base 23 in such manner that the free end of the die-carrier may be swung along the slot E to a position beneath the free end of the guide 57. When in this latter position, a threading die consisting of the two halves F and G is concentrically disposed beneath the bushing 58 so that a piece of stock held in the chuck and forced downward will be engaged by the die and threaded. A spring H tends to thrust the arms A and B apart to release the die from the stock that has been threaded. When it is desired to use this threading arrangement, the two arms A and B are grasped by the thumb and forefinger, and these arms are pressed together against the tension of the spring H, and until the heads A' B' of the arm which constitute the holder for the die are forced together enough to permit pins I to snap into openings J that are formed in blocks K, said blocks being adjustable radially of the die holder by means of adjusting screws L. By the proper adjustment of the screws L the die may be set to cut an oversized or an undersized or a standard size thread, as desired. The pins I are carried upon the head M of a sleeve N. A screw O is threaded into the bottom of this sleeve, and carries a knurled head P. A spring Q bears between the lower end of the sleeve and the bottom of a cylinder R in which the sleeve is mounted for vertical movement. When, during the threading operation, the lower end of the stock that is being threaded contacts with the upper end of the screw O, said screw and sleeve N are forced outwardly to carry the pins I out of the openings J. This frees the heads A' B' constituting the die carrier, and permits the spring H to thrust the arms A and B apart enough to dis-engage the die from the stock that is being threaded, so that the stock may be withdrawn from the die by a direct outward movement, and without the necessity of reversing the direction of rotation of the drill press. The cylinder R is cast with, and is rigidly attached to a swinging block S, which, like the arms A and B is pivotally mounted upon the screw D. Thus all of the parts swing bodily together to and from operative position, this threading attachment when not in use, lies in the full line position illustrated in Fig. 12, to permit other operations to be carried out without interference by this attachment. To insure that the two halves of the die will move outwardly with the arms to free the threaded stock, I provide dogs T, which are held to the heads of the die holder by screws U, and which carry down-turned lugs V; said lugs entering the usual recesses W found in dies of this character. This arrangement is advantageous because these dies are made of such very hard material that it is very difficult to drill into them. I utilize the recesses already present in the dies for receiving means for the holding dogs described. I preferably provide stop-pins Z upon the block S to limit the movement of the arms A and B. It is to be understood that the invention is not limited to the precise construction set forth, but that it includes within its purview whatever changes fairly come either within the terms or the spirit of the appended claims.

Having described my invention, what I claim is:

1. The combination with a drill press comprising a drill receiving element and table, of means driven by said element for gripping and imparting turning movement to a piece of stock that is to be turned off, a base block, means for securing said base block to the drill table, a slide upon the base block, a turning tool carried by the slide, and settable stop means for limiting the movement of the slide.

2. The combination with a drill press comprising a drill receiving element and table, of means driven by said element for gripping and imparting turning movement to a piece of stock that is to be turned off, a base block, means for securing said base block to the drill table, a slide upon the base block, a turning tool carried by the slide, and a plurality of settable means for limiting the movement of the slide.

3. The combination with a drill press comprising a spindle and table, of a chuck driven from the spindle and adapted to have stock pass therethrough, means for feeding said chuck upwardly and downwardly, settable stops for determining the degree of downward movement of the stock, a base block, means for securing the base block to the table, a tool carrying slide carried by the base block, means for imparting feeding movement to said slide, and means for limiting the movement of said slide.

4. The combination with a drill press comprising a spindle and table, of a chuck driven from the spindle and adapted to have stock pass therethrough, means for feeding said chuck upwardly and downwardly, settable stops for determining the degree of downward movement of the stock, a base block, means for securing the base block to the table, a tool carrying slide carried by the base block, means for imparting feeding movement to said slide, means for limiting the movement of said slide, and a bushing supported from the base block as and for the purposes set forth through which the stock passes.

5. The combination with a drill press comprising a spindle and table, of a chuck driven from the spindle and adapted to have stock pass therethrough, means for feeding said chuck upwardly and downwardly, settable stops for determining the degree of downward movement of the stock, a base block, means for securing the base block to the table, a tool carrying slide carried by the base block, means for imparting feeding movement to said slide, means for limiting the movement of said slide, and a removable and interchangeable bushing supported from the base block as and for the purposes set forth through which the stock passes.

6. A structure of the character described comprising a drill press including a drill spindle and a drill table, a change speed gearing driven from the drill spindle, a chuck actuated by said gearing, a base secured to the drill table, a slide carried by the base, a turret carried by the slide, and a plurality of tools carried by the turret as and for the purposes set forth.

7. A structure of the character described comprising a drill press including a drill spindle and a drill table, a change speed gearing driven from the drill spindle, a chuck actuated by said gearing, a base secured to the drill table, a slide carried by the base, a turret carried by the slide, and a plurality of tools carried by the turret as and for the purposes set forth, one at least of said tools comprising a die.

8. A structure of the character described comprising a drill press including a drill spindle and a drill table, a change speed gearing driven from the drill spindle, a chuck actuated by said gearing, a base secured to the drill table, a slide carried by the base, a turret carried by the slide, a plurality of tools carried by the turret as and for the purposes set forth, a stock guide mounted upon the base block, and a bushing carried by said guide through which the stock passes.

9. A structure of the character described comprising a drill press including a drill spindle and a drill table, a change speed gearing driven from the drill spindle, a chuck actuated by said gearing, a base secured to the drill table, a slide carried by the base, a turret carried by the slide, a plurality of tools carried by the turret as and for the purposes set forth, a stock guide mounted upon the base block, a bushing carried by said guide through which the stock passes, and a stock stop carried by said guide.

10. In an attachment for drill presses, the combination of a base block having means for attachment to a drill table, of a slide mounted thereon, a turret carried by said slide, a plurality of tools carried by said turret, and actuating means carried by the base block and acting upon said slide to move the same.

11. A structure as recited in claim 10 in combination with a guide block carried by the base block, an interchangeable bushing carried by the guide block, and a stock stop carried by the guide block and movable to and from positions overlying said bushing.

12. A structure as recited in claim 10 in combination with a plurality of limiting stops carried by the base and limiting the movement of said slide.

13. A structure as recited in claim 10 in combination with a plurality of independently adjustable stop slides carried by the base, and removable elements carried by the slide for engaging the respective stop slides.

14. A structure of the character described comprising a frame, a change-speed gearing therein, a base by which the frame is carried, means for attaching said base to the table of the drill press, a shank adapted to engage the drill socket of the drill press and constituting the driving means for the change-speed gearing, a chuck driven from said change-speed gearing, means carried by the base for holding tools and for advancing said tools to and from operative position with respect to stock held in said chuck.

15. A structure as recited in claim 14, in combination with a stop mechanism comprising a plurality of vertically arranged adjustable stop members, a radially adjustable stop adapted to be moved beneath a chosen one of said stop members, a floating plunger by which said stop is carried, a part with which the lower end of said floating plunger contacts, and a vertically movable sleeve by which the stop screws and the floating plunger are carried.

16. The combination with a conventional vertical type drill press, its drill spindle and table, of a stock gripping chuck driven from the drill spindle and adapted to impart turning movement to a piece of stock, a tool adapted to act upon said stock at a point above the lower end of said stock, and means for supporting said tool from the drill table for movement toward and from the stock.

17. The combination with a conventional vertical type drill press, its drill spindle and table, of a stock gripping chuck driven from the drill spindle and adapted to impart turning movement to a piece of stock, a tool adapted to act upon said stock at a point above the lower end of said stock, means for supporting said tool from the drill table for movement toward and from the stock, and a guide for the stock supported from the drill table.

18. The combination with a conventional vertical type drill press, its drill spindle and table, of a vertically movable, stock-gripping chuck driven from the drill spindle and adapted to impart turning movement to a piece of stock, a slide-carrying block mounted upon the drill table, a slide mounted in said block, means for reciprocating the slide in the block toward and from the stock to be operated upon, a tool carried by said slide, and a guide carried by the block for engaging the stock and holding the same against lateral deflection during the action of the tool thereon.

19. A structure as recited in claim 18, in combination with a plurality of settable stops for determining the degree of downward movement of the stock driving chuck.

20. The combination with a vertical type drill press, its drill spindle and table, of a chuck driven from the drill spindle, said chuck being adapted to grip stock and impart a turning movement to the same about its axis, a tool adapted to act upon the side of the stock at a point above the lower end of said stock, a slide by which the tool is carried, means for supporting said slide from the conventional table of the drill press, means for advancing the slide toward and from the stock to cause the tool to act upon the side of the stock, settable stop means for limiting the degree of advancement of the tool, and settable stop means for limiting the vertical movement of the chuck.

21. The combination with a vertical drill press including the usual drill spindle and table, of a reducing gear mechanism assembly comprising a part adapted to be engaged with the drill spindle to rotate said gear mechanism, and a chuck driven by said reducing gear mechanism, a carrier block, means for securing said carrier block upon the drill press table, a tool carrying slide mounted upon the carrier block, a guide mounted upon the carrier block, for holding stock rotated by the chuck against lateral movement during the action of tools carried by said slide, a die mechanism mounted for swinging movement upon said block and adapted to be swung into alignment with said guide, said die comprising a pair of arms mounted for movement toward and from each other, die sections carried by said arms, a spring tending to move said arms apart, and spring actuated means holding the arms in closed position, said spring actuated means comprising a part disposed in the path of movement of stock being threaded by said die, whereby movement of the stock into said die moves said part against the action of its spring to release the holding means of the die.

22. The combination with a drill press comprising a spindle and drill table, of a stock rotating part driven from said spindle, a die structure comprising a pair of hingedly connected arms, die sections mounted therein, a block underlying said arms, means for holding said block upon the drill table in position to bring the die structure into alignment with stock carried by the stock rotating part, a cylinder depending from said block, a sleeve vertically movable in said cylinder, a spring within the cylinder upon which the sleeve bears, an adjusting screw passing through the bottom of the cylinder and engaging the sleeve, and having its inner end exposed in said sleeve, and a pair of pins carried by the upper end of the sleeve and adapted to be projected by said sleeve into socketed portions of the die carrying arms to hold said arms together until said pins are withdrawn.

23. A structure as recited in claim 22 wherein said socketed members are laterally adjustable with respect to the die carrying arms.

24. The combination with the conventional vertical type drill press comprising a spindle and table, of a support provided with means for the attachment thereof to the drill table, and a die structure mounted upon said support to swing in a determined path and in such manner that when swung, the die structure may be brought into and out of alignment with the drill spindle.

25. The combination with the conventional vertical type drill press comprising a spindle and table, of a support provided with means for the attachment thereof to the drill table, a die structure mounted upon said support to swing in a determined path and in such manner that when swung, the die structure may be brought into and out of alignment with the drill spindle, said die comprising a pair of cutting elements movable toward and from each other, said elements when lying close to each other constituting the cutting position of the die and when moved away from each other constituting the open position of the die, and means controlled by the movement of a piece of stock actuated from the drill spindle for moving the die to open position after a predetermined movement of the stock into said die.

26. The combination with the conventional vertical type drill press comprising a spindle and table, of a support provided with means for the attachment thereof to the drill table, a die structure mounted upon said support to swing in a determined path and in such manner that when swung, the die structure may be brought into and out of alignment with the drill spindle, and a guide carried by said support and lying at least in part in spaced relation to the support to permit the die to swing thereunder so that stock may be guided by said guide into said die.

CLARENCE TURNEPSEED.